April 9, 1968     R. C. SWANSON     3,377,097
VIBRATION DAMPED RAILWAY WHEEL
Filed June 23, 1966
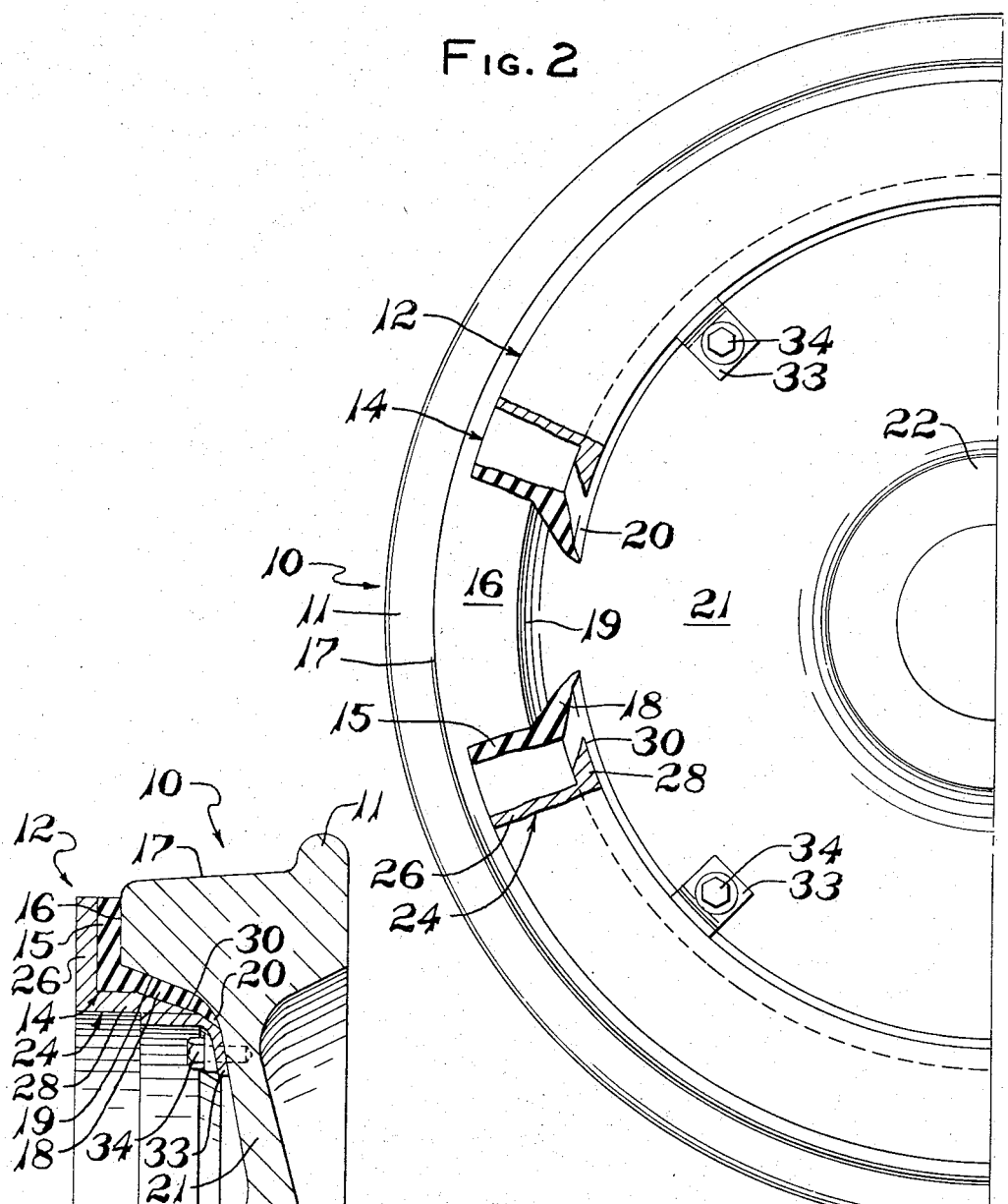
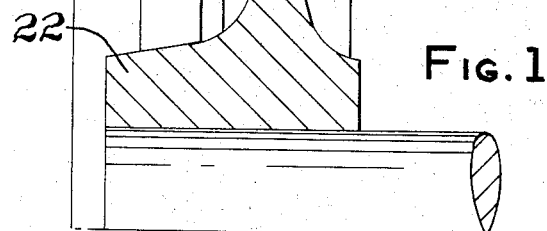
INVENTOR.
ROGER C. SWANSON
BY John D. Haney
ATTY.

United States Patent Office 3,377,097
Patented Apr. 9, 1968

3,377,097
VIBRATION DAMPED RAILWAY WHEEL
Roger C. Swanson, Macedonia, Ohio, assignor to The B. F. Goodrich Company, New York, N.Y., a corporation of New York
Filed June 23, 1966, Ser. No. 559,961
9 Claims. (Cl. 295—7)

ABSTRACT OF THE DISCLOSURE

In a rigid rolling wheel noise emission primarily results from load-induced vibrations in the heavy rim of the wheel (as distinguished from the web and hub). The lateral or axial and the radial components of such vibration can be damped thereby materially suppressing noise radiation by viscoelastic material adhered to radial side surfaces of the rim adjoining its load-engaging tread and also to the adjoining axial surfaces of the rim. The noise suppression is particularly effective where these materials further include overlying rigid constraining layers.

---

This invention relates to vibration damping in rigid wheels, primarily, to suppress objectionable noise, and secondarily, to minimize fatigue stress resulting from vibration. More particularly, the invention is directed to the damping of vibrations induced by periodic impact loads on the rim of a wheel, as distinguished from vibration induced by imbalance or other causes. The "wheels" discussed in connection with this invention are assumed to be dynamically balanced and free of vibration other than that caused by rim impact loads.

The invention has special utility for quieting the rolling noise of common rigid metal railroad wheels, and it is also useful for this purpose with large gears, heavy turbine wheels and similar rotating parts subject to peripheral impact loads. Although the invention is discussed with specific reference to railroad wheels, the word "wheel" is used broadly to include gears and similar rigid rotating parts.

According to this invention, the familiar hum and noisy clack and clatter of a common flanged railroad wheel rolling on a smooth steel track may be materially suppressed, and squeal on curves practically eliminated merely by attaching to the wheel at selected places the damping system hereinafter described. The damping system is particularly located to provide for maximum noise suppression efficiency with a minimum of weight added to the wheel. The addition of the damping material does not alter the basic structure of the railroad wheel itself, the mechanical merits of which have beeen proven by more than a century of service experience.

We have discovered that the major portion of the objectionable noise emitted by a rolling railroad wheel results from load-induced vibrations in the heavy rigid rim of the wheel. The rim tends to vibrate laterally (i.e. axially of the wheel) by the lateral engagement of its flange against the rail on curves, and it tends to vibrate radially because of the rolling engagement of its periphery along the top of the track. The resonant frequencies of the resultant vibrations are governed primarily by the shape and elasticity of the rim. In any given wheel, however, rim vibration must be controlled in order to materially suppress the noise radiated by the total configuration of rim, web and hub. The amplitudes of the resonant vibrations are limited by structural and frictional constraints.

Damping material is accordingly applied only to the wheel rim; preferably it is firmly bonded or adhered to the annular radial side of the rim opposite its flange, and preferably to the annular interior axial side of the rim opposite the tread surface of the periphery of the wheel leaving the tread surface bare. The damping material is coextensive in area with the radial and axial sides of the rim to which it is applied. The preferred damping material includes a durable, deformable rubber or polymer compounded so that in the range of temperatures in which it is used, it has very high hysteresis. As compared with say tire tread compounds, these damping compounds are elastic but with a much slower deformation-recovery rate, and therefore tend to dissipate a much higher proportion of the energy deforming it into internal heat than the typical tire tread compounds. There are a wide variety of polymers capable of being compounded to provide these properties. Such damping compounds are hereinafter collectively called "viscoelastic" materials.

The viscoelastic material is preferably constrained on its outside surface (i.e. the surface opposite that which is bonded to the wheel rim) by a rigid ring or plate also bonded to the material to provide constrained-layer damping. These constraining plates need not and preferably do not exert any compression on the underlying viscoelastic material under normal conditions when the wheel is not in rolling operation. They constrain the deformation of the viscoelastic material when the rim is vibrating and thereby cooperate with the material to damp such vibrations. The viscoelastic material and the overlying constraining plates are advantageously made in a single piece so that these fit around the corner between the radial side and the axial side of the rim. Accordingly, vibration in the rim tends to load the layer of viscoelastic material on the rim in alternating positive and negative shear, while the constraining layer tends to be loaded alternately in tension and compression. Using separate layers of viscoelastic material and constraining plates on these sides will effectively damp vibration, but ordinarily a thicker constraining layer would have to be used for separate layers than if the two layers were integrally joined.

The damping material (i.e. the viscoelastic material and the constraining plates) may be installed on existing in-service railroad wheels without even removing them from their axles, but preferably the damping material is applied when the wheel is initially made.

The invention will be further described with reference to the accompanying drawings which show, by way of example, a railroad wheel embodying damping material according to the principles of this invention. In the drawings:

FIG. 1 is a transaxial partial section through a typical rigid metal railroad wheel; and
FIG. 2 is a partial axial view of the FIG. 1 wheel.

Referring to FIG. 1, the railroad wheel shown is of standard or common shape. It has a heavy rigid rim 10 including a side flange 11. An assembly 12 of vibration damping material is attached to the non-flanged side of the rim.

The vibration damping assembly 12 has a single thick layer 14 of viscoelastic polymer which in cross section is angle or L-shaped. This layer has a generally vertical leg 15 adhered directly to the radial side 16 of the rim opposite flange 11, and covering the entire area of the radial side 16 except the regions of it near the track-engaging external peripheral tread surface 17 of the wheel. Another leg 18 of layer 14 extends generally horizontally and is adhered directly to the axial interior surface 19 of the rim, opposite tread surface 17. Leg 18 follows the curvature of interior rim surface 19 and tapers slightly to a narrow inner edge 20 adjoining the wheel web 21. The latter, web 21, in this wheel is a solid slightly dished member connecting the rim 10 to a hub 22 on which the wheel is mounted for rotation.

Vibration damping assembly 12 further includes an angle or L-shaped rigid metal constraining ring 24 which is complementary to the shape of the viscoelastic layer 14 so that it snugly embraces the outside surface of the layer 14. Constraining ring 24 includes a radial leg 26 coextensive in area with leg 15 of layer 14 and an axial leg 28 coextensive with axial leg 18 of layer 14. Each leg of the ring 24 is bonded or adhered firmly to the adjoining surface of layer 14, and axial leg 28 tapers in cross section to a thin inner edge 30 as it approaches wheel web 21.

The viscoelastic layer 14 and the constraining ring 24 are full, continuous annuli as indicated in FIG. 2. They are, of course, circumferentially homogeneous and located accurately concentric with the hub to maintain dynamic balance in the wheel.

A variety of suitable adhesive systems are available for adhering or bonding the constraining ring 24 to layer 14, and the latter to the sides of the wheel rim 10, and a properly applied adhesive system is adequate to keep assembly 12 properly positioned on the rim. Optionally, the ring 24 may be provided with evenly spaced lugs 33 fitting against web 21 and attached by bolts 34 (one shown in the drawing) merely to insure that ring 24 is held in proper position if there should be a failure of the adhesive or the viscoelastic layer. The lug fastener 33 is not intended to and preferably does not cause ring 24 to exert any significant compressive load on layer 14, the latter being essentially relaxed or at least only slightly compressed when the wheel is at rest.

For newly manufactured wheels it is most convenient to preform ring 24 and layer 14 as continuous circular rings. For wheels in service, the ring 24 and layer 14 may be divided into semi-circular form for mounting, without even removing the wheel from its axle, in which case damping is improved if the abutting ends of the constraining ring are then welded together after mounting to stiffen the ring.

For railroad wheels the thickness of the constraining ring 24 (apart from the tapered region of lug 28) may vary from about 0.100 to about 1.000 inch. The layer 14, similarly, may vary from about 0.010 to 1.500 inches depending on the particular properties of the viscoelastic compound, the vibration frequencies, and the operating temperature. One installation we have made used a viscoelastic compound of The B. F. Goodrich Company, Akron, Ohio, identified by the trademark "Deadbeat" for layer 14 which was 0.500 inch thick, and a constraining ring 24 of steel which was 0.500 inch thick. This system was of optimum effectiveness at 75° Fahrenheit.

Variations in the structure disclosed may be made within the scope of the following claims.

What is claimed is:

1. A wheel in which an annular rigid rim, rigidly supported by a web and central hub integral with the rim, has an external rigid load-bearing tread surface with an annular radial side on the rim extending inwardly from the tread, and with an annular axial internal side on the rim extending toward the web, and characterized by a first annular layer of viscoelastic damping material adhered to said radial side of the rim and a second annular layer of viscoelastic damping material adhered to said axial side of the rim which second layer terminates near the junction of the rim and the web without engaging any significant area of the web, said layers cooperating for damping vibrations of said sides induced by periodic impact loads on said rigid load-bearing tread surface adjoining said sides of the rim.

2. A wheel as defined in claim 1 and further characterized in that a rigid constraining member overlaps and is adhered to the outside surface of each said layer of damping material.

3. A wheel as defined in claim 2 and further characterized in that the rigid constraining members of each damping layer are integrally joined to each other.

4. A wheel as defined in claim 3 and further characterized in that said rigid constraining members are annular and circumferentially continuous with substantially the entire area of said underlying radial and axial damping layers.

5. A wheel as defined in claim 1 and further characterized in that said layer of viscoelastic damping material extends continuously from said radial side to said axial side of said rim.

6. A wheel as defined in claim 2 and further characterized in that said first and second layers are annular and circumferentially continuous with substantially the entire area of said radial and axial sides of said rim.

7. A railroad wheel in which an annular side-flanged rigid rim, rigidly supported by a web and central hub integral with the rim, has an external peripheral hard rail-engaging tread surface and, on the side of the rim opposite its side flange, has an annular radial side on the rim extending inwardly from the tread to an annular axial internal side on the rim opposite the tread and extending toward the web, and characterized by a layer of viscoelastic damping material which is adhered to said radial side of the rim and to said axial side of the rim and which extends continuously from said radial side to said axial side and is annularly coextensive with substantially the entire area of said radial and axial sides, but which terminates near the junction of the rim and the web without engaging any significant area of the web, and an annular rigid constraining member overlying and adhered to the outside of said layer of damping material throughout its area on said radial and axial sides.

8. A railroad wheel as defined in claim 7 wherein said layer of damping material is of substantially uniform thickness, the thickness being in the range of 0.010 inch to about 1.500 inches.

9. A railroad wheel as defined in claim 7 and further characterized by means for fastening said rigid constraining member to the web of said wheel.

References Cited

UNITED STATES PATENTS

| | | | |
|---|---|---|---|
| 228,430 | 6/1880 | Woodbury | 295—7 |
| 1,689,052 | 10/1928 | Rodgers | 295—7 |
| 1,972,678 | 9/1934 | Bourbon | 295—7 |
| 1,980,663 | 11/1934 | Burrows et al. | 295—7 X |
| 2,024,375 | 12/1935 | Latshaw | 295—7 |

ARTHUR L. LA POINT, *Primary Examiner.*

H. BELTRAN, *Assistant Examiner.*